(12) United States Patent
Fristad et al.

(10) Patent No.: US 7,063,735 B2
(45) Date of Patent: Jun. 20, 2006

(54) COATING COMPOSITION

(75) Inventors: William E. Fristad, Rochester Hills, MI (US); Jeng-Li Liang, Auburn Hills, MI (US); Timothy S. Kelly, Shelby Township, MI (US)

(73) Assignee: Henkel Kommanditgesellschaft Auf Aktien (DE)

( * ) Notice: Subject to any disclaimer, the term of this patent is extended or adjusted under 35 U.S.C. 154(b) by 194 days.

(21) Appl. No.: 10/339,405

(22) Filed: Jan. 10, 2003

(65) Prior Publication Data

US 2004/0137246 A1 Jul. 15, 2004

(51) Int. Cl.
 *C23C 22/06* (2006.01)
 *C23C 22/48* (2006.01)
 *C23C 22/84* (2006.01)
 *C23F 11/00* (2006.01)
 *C09D 5/08* (2006.01)

(52) U.S. Cl. .............. 106/14.44; 106/14.11; 106/14.41; 106/14.43; 148/244

(58) Field of Classification Search ............ 106/14.41, 106/14.43, 14.44, 14.11; 148/244
See application file for complete search history.

(56) References Cited

U.S. PATENT DOCUMENTS

| | | | | |
|---|---|---|---|---|
| 3,749,649 A * | 7/1973 | Valayil | ............ | 205/254 |
| 3,912,548 A | 10/1975 | Faigen | | |
| 5,061,575 A | 10/1991 | Mohri et al. | | |
| 5,262,464 A | 11/1993 | Koevenig et al. | | |
| 5,281,282 A | 1/1994 | Dolan et al. | | |
| 5,356,490 A | 10/1994 | Dolan et al. | | |
| 5,427,632 A * | 6/1995 | Dolan | ............ | 148/259 |
| 5,449,415 A * | 9/1995 | Dolan | ............ | 148/259 |
| 5,534,082 A | 7/1996 | Dollman et al. | | |
| 5,571,447 A * | 11/1996 | Ward et al. | ............ | 510/206 |
| 5,639,586 A | 6/1997 | Hauquier et al. | | |
| 5,769,967 A * | 6/1998 | Dolan | ............ | 148/247 |
| 5,859,106 A | 1/1999 | Jones et al. | | |
| 5,897,716 A * | 4/1999 | Reghi et al. | ............ | 148/247 |
| 5,905,105 A | 5/1999 | Jones et al. | | |
| 5,938,861 A | 8/1999 | Inoue et al. | | |
| 6,153,080 A | 11/2000 | Heimann et al. | | |
| 6,361,602 B1 | 3/2002 | Hahn | | |
| 6,372,043 B1 | 4/2002 | Tracy et al. | | |
| 6,388,021 B1 | 5/2002 | Shibata et al. | | |
| 6,464,800 B1 * | 10/2002 | Carlson et al. | ............ | 148/244 |
| 6,764,553 B1 * | 7/2004 | Dolan | ............ | 148/243 |
| 2001/0050029 A1 | 12/2001 | Inbe et al. | | |
| 2002/0053301 A1 | 5/2002 | Matzdorf et al. | | |
| 2005/0020746 A1 * | 1/2005 | Fristad et al. | ............ | 524/413 |

FOREIGN PATENT DOCUMENTS

| | | |
|---|---|---|
| EP | 1063320 A1 | 12/2000 |
| EP | 1130131 A2 | 9/2001 |
| JP | 58-101427 | 12/1984 |
| WO | WO00/26437 A1 * | 5/2000 |
| WO | WO-00/39356 A1 | 7/2000 |
| WO | WO-00/68459 | 11/2000 |
| WO | WO-02/31063 A1 | 4/2002 |
| WO | WO-02/31222 A2 | 4/2002 |

OTHER PUBLICATIONS

"Meaning of Alizarin", http://hyperdictionary.com/alizarin (no date).*
Derwent Abstract No. 1998-019180, abstract of Chinese Patent Specification No. 1133903A (Oct. 1996).*
Geeta Parashar et al., "Ethyl Silicate Binders For High Performance Coatings", Progress in Organic Coatings 42, 2001, pp. 1-14.

* cited by examiner

*Primary Examiner*—Anthony J. Green
(74) *Attorney, Agent, or Firm*—Connolly, Bove, Lodge & Hutz LLP

(57) ABSTRACT

A coating composition comprising an aqueous mixture containing inorganic particles, a catechol compound, and one or more fluoroacids. The preferred fluoroacids are selected from fluorotitanic acid, fluorozirconic acid, fluorosilicic acid, fluoroboric acid, fluorostannic acid, fluorogermanic acid, fluorohafnic acid, fluoroaluminic acid or salts of each thereof. The invention is also directed to a coating on a metal substrate. The coating comprises silica particles attached to the metal substrate through a metal-oxide matrix. The metal-oxide matrix comprises a metal selected from titanium, zirconium, silicon, hafnium, boron, aluminum, germanium, or tin, and a catechol compound.

26 Claims, No Drawings

COATING COMPOSITION

FIELD OF THE INVENTION

The present invention relates to coating compositions, in particular, coating compositions that can be applied to metal substrates to enhance corrosion resistance. The invention also relates to the coatings obtained from the coating compositions, and the method of forming a coating on a metal substrate.

BACKGROUND OF THE INVENTION

A coating is often applied to metal substrates, especially metal substrates that contain iron such as steel, prior to the application of a protective or decorative coating. The coating minimizes the amount of corrosion to the metal substrate, if and when, the metal substrate is exposed to moisture and oxygen. Many of the present coating compositions are based on metal phosphates, and rely on a chrome-containing rinse. The metal phosphates and chrome rinse solutions produce waste streams that are detrimental to the environment. As a result, there is the ever-increasing cost associated with their disposal.

Coating compositions can be applied without chrome rinse solutions. For example, U.S. Pat. No. 3,966,502 discloses post-treating phosphated metals with zirconium-containing rinse solutions. However, this application process is only suitable for use over a limited number of metal substrates, and the generation of metal phosphate waste streams is not alleviated.

U.S. Pat. No. 5,534,082 to Dollman et al. and U.S. Pat. Nos. 5,281,282 and 5,356,490 to Dolan et al. describe non-chrome coating compositions containing a fluoroacid such as fluorotitanic acid, dispersed solids such as silica, and a water-soluble polymer such as an acrylic acid polymer and/or a polymer with hydroxyl functionality. The coatings compositions enhance the corrosion resistance of steel and galvanized steel substrates. Also, the pH of these compositions are strongly acidic, and range from 0 to 4, preferably from 0 to 1.

U.S. Pat. No. 5,938,861 to Inoue et al. describes forming a coating on metal substrates, except aluminum. The coating composition includes an oxidative compound such as nitric acid or hydrogen peroxide, silicate or silicon dioxide particles, and a metal cation, oxymetal anion, or fluorometallate anion of Ti, Zr, Ce, Sr, V, W, amd Mo.

U.S. Pat. No. 5,859,106 to Jones et al. describes a non-chrome coating composition said to contain a cross-linked polymer system and a fluoroacid such as fluorozirconic acid or fluorotitanic acid. The polymer system includes a copolymer with acrylic and hydroxyl functionality or the reaction product of an acrylic polymer and a polymer with hydroxyl functionality. U.S. Pat. No. 5,905, 105 to Jones et al. describes a non-chrome coating composition that includes the coating composition described in U.S. Pat. No. 5,859,106 and dispersed silica. The dispersed silica is present in the compositions in an amount from 40% to 70% by weight, calculated on a dry weight basis.

There is an interest to develop coating compositions and methods of applying such compositions without producing metal phosphate and chrome waste solutions. It is also preferred, that these coating compositions be effective in minimizing corrosion in a variety of metal substrates because many objects of commercial interest contain more than one type of metal substrate. For example, the automobile industry often relies on metal components that contain more than one type of metal substrate. The use of a coating composition effective for more than one metal substrate whould provide a more streamlined manufacturing process.

SUMMARY OF THE INVENTION

The invention is directed to a coating composition and a process of making the coating composition. The coating composition comprises an aqueous mixture comprising inorganic particles, a catechol compound, and one or more fluoroacids. The preferred fluoroacids are selected from the group consisting of fluorotitanic acid ($H_2TiF_6$), fluorozirconic acid ($H_2ZrF_6$), fluorosilicic acid ($H_2SiF_6$), fluoroboric acid ($HBF_4$), fluorostannic acid ($H_2SnF_6$), fluorogermanic acid ($H_2GeF_6$), fluorohafnic acid ($H_2HfF_6$), fluoroaluminic acid ($H_3AlF_6$) and salts of each thereof.

The invention is also directed to a coating on a metal substrate. The coating comprises inorganic particles attached to the metal substrate through a metal-oxide matrix. The metal-oxide matrix comprises one or more metals selected from the group consisting of titanium, zirconium, silicon, hafnium, boron, aluminum, germanium, and tin, and a catechol compound.

DESCRIPTION OF THE INVENTION

The coating composition comprises an aqueous mixture comprising inorganic particles, a catechol compound, and one or more fluoroacids. The aqueous mixture can also contain a product of the inorganic particles and the catechol compound. The aqueous mixture can also contain a product of the inorganic particles and the one or more fluoroacids.

The presence of the catechol compounds in the coating compositions of the invention provides a visible color indicator that the metal substrate is indeed coated. Without the catechol compound, the coating is too thin to be visible. The term "catechol compound" is defined as an organic compound with an aromatic ring system that includes at least two hydroxyl groups positioned on adjacent carbon atoms of the aromatic ring system.

The preferred catechol compounds used to prepare the coating compositions of the invention are negatively charged or neutral, that is, have no charge. The negatively charged catechol compounds are commonly available as metal salts, particularly as alkali or alkaline earth metal salts.

The concentration of catechol compound in the coating compositions of the invention can be optimized by those skilled in the art to provide a visible coating. The concentration of the catechol compound will depend on the type of catechol compound used. Also, each catechol compound can be expected to have a different interaction with each type of inorganic particle used in the coating composition. As a result, the optimal concentration of catechol compound depends upon which type(s) of inorganic particles are used in the coating compositions. Lastly, because any excess catechol compound can be removed with a rinse step following application of the coating composition to a metal substrate, the concentration of the catechol compound can be greater than what is required to provide a visibly colored coating.

The fluoroacid is an acid fluoride or acid oxyfluoride with an element selected from the group consisting of Ti, Zr, Hf, Si, Sn, Al, Ge and B. The fluoroacid should be water-soluble or water-dispersible and preferable comprises at least 1 fluorine atom and at least one atom of an element selected from the group consisting of Ti, Zr, Hf, Si, Sn, Al, Ge or B. The fluoroacids are sometimes referred to by workers in the field as "fluorometallates".

The fluoroacids can be defined by the following general empirical formula (I):

  (I)

wherein: each of p, q, r, and s represents an integer from 1 to 10, and p and s can be zero (0); T represents an element selected from the group consisting of Ti, Zr, Hf, Si, Sn, Al, Ge, and B; r is at least 1; and q is at least 1. Preferred fluoroacids of empirical formula (I) include: T is selected from Ti, Zr, or Si; p is 1 or 2; q is 1; r is 2, 3, 4, 5, or 6; and s is 0, 1, or 2.

One or more of the H atoms may be replaced by suitable cations such as ammonium, metal, alkaline earth metal or alkali metal cations (e.g., the fluoroacid can be in the form of a salt, provided such salt is water-soluble or water-dispersible). Examples of suitable fluoroacid salts include $SrSiF_6$, $MgSiF_6$, $Na_2SiF_6$ and $Li_2SiF_6$.

The preferred fluoroacids used in the coating compositions of the invention are selected from the group consisting of fluorotitanic acid ($H_2TiF_6$), fluorozirconic acid ($H_2ZrF_6$), fluorosilicic acid ($H_2SiF_6$), fluoroboric acid ($HBF_4$), fluorostannic acid ($H_2SnF_6$), fluorogermanic acid ($H_2GeF_6$), fluorohafnic acid ($H_2HfF_6$), fluoroaluminic acid ($H_3AlF_6$), and salts of each thereof. The more preferred fluoroacids are fluorotitanic acid, fluorozirconic acid, fluorosilicic acid, and salts of each thereof. Some of the salts that can be used include alkali metal and ammonium salts, e.g., $Na_2MF_6$ and $(NH_4)_2\ MF_6$, where M is Ti, Zr, and Si.

The concentration of the one or more fluoroacids in the coating compositions of the invention can be relatively quite low. For example, a fluoroacid concentration of about 5 ppm can be used, and still provide corrosion resistant coatings. The concentration of the one or more fluoroacids in the coating compositions is from about 5 ppm (about 0.0005% by weight) to about 10,000 ppm (about 1.0% by weight). The preferred concentrations of the one or more fluoroacids in the coating compositions is from about 3 ppm to about 3000 ppm, more preferably from about 10 ppm to about 400 ppm. The final concentration, of course, will depend upon the amount of water used to prepare the coating concentrations of the invention.

In one embodiment, the catechol compound is selected from the alizarin series of compounds. For example, alizarin, alizarin red, alizarin blue, alizarin orange, and the salts of each thereof can be used to prepare the coating compositions of the invention. One preferred alizarin compound is alizarin red, i.e., 4,3-dihydroxy-9,10-dioxo-2-anthracenesulfonic acid or the salt thereof.

Exemplary coating compositions of the invention containing alizarin red can be prepared by providing alizarin red or a salt thereof, as a weight ratio of fluoroacids:alizarin red from 300:1 to 1:50.

In another embodiment, the catechol compound is selected from pyrocatechol, and conjugated pyrocatechols. The term "conjugated pyrocatechol" is defined as pyrocatechol with a conjugated ring system. Pyrocatechol sulfonephthalein, i.e., pyrocatechol violet, or the salts thereof, is one preferred conjugated pyrocatechol.

Exemplary coating compositions of the invention containing pyrocatechol sulfonephthalein can be prepared by providing pyrocatechol sulfonephthalein or a salt thereof, as a weight ratio of fluoroacids:pyrocatechol sulfonephthalein from 300:1 to 1:30.

The inorganic particles can be relatively spherical in shape with an average diameter from about 2 nm to about 40 nm, preferably from about 2 nm to about 20 nm, as measured by transmission electron microscopy (TEM). The particles can also be rod-shaped with an average length from about 40 nm to about 300 nm, and an average diameter from about 5 nm to about 20 nm. The particles can be provided as a colloidal dispersion, e.g., as a mono-dispersion, i.e., the particles have a relatively narrow particle size distribution. Alternatively, the colloidal dispersion can be poly-dispersed, i.e., the particles have a relatively broad particle size distribution.

The inorganic particles used to prepare the coating compositions of the invention are preferably what are known as acid-stable inorganic particles. An inorganic particle is acid-stable if the particle maintains a negative charge at a pH from about 2 to about 6. An inorganic particle is also acid-stable if the particles disperse in water and remains dispersed over a period of at least two weeks as measured by a percent transmission from 20 to 100. Preferably, the particles will disperse in water and maintain a percent transmission from 45 to 100 over a period of at least two weeks.

The concentration of inorganic particles in the compositions of the invention depends on the type of inorganic particles used and the relative size, e.g., average diameter, of the particles. The coating compositions will contain from about 0.01% to about 5% by weight, preferably from about 0.02% to about 1% by weight, of the inorganic particles.

In one embodiment, the inorganic particles used in a coating composition are silica particles provided as a colloidal suspension from Grace Davison under the trademark Ludox®. The silica particles are in the form of discrete spheres suspended in a basic, aqueous medium. The medium can also contain a water-soluble polymer to improve stability of the colloidal suspension. The water-soluble polymer can be one of the listed polymers provided below.

A preferred type of silica particle used to prepare the coating compositions of the invention is what is known as acid-stable silica particles. Acid-stable silica particles can be alumina-modified silica. Alumina-modified silica will have a weight ratio of $SiO_2:Al_2O_3$ from about 80:1 to 240:1, preferably from about 120:1 to 220:1, more preferably from 160:1 to 200:1.

Preferred acid-stable silicas used to prepare the coating compositions of the invention include Ludox® AM and Ludox® TMA. Ludox® AM has a weight ratio of $SiO_2:Al_2O_3$ from about 160:1 to 200:1.

Other types of Ludox® silica particles that can be used to prepare a coating composition of the invention include Ludox® SK-G and Ludox® SK. Ludox® SK has an average particle diameter of about 12 nm, and Ludox® SK-G has an average particle diameter of about 7 nm. Both commercial forms of colloidal silica contain a polyvinyl alcohol polymer, which is used to stabilize the colloids.

In other embodiments, silica particles used in the coating compositions are obtained as a colloidal suspension from Nissan Chemical under the trademark Snowtex® In particular, Snowtex® O, Snowtex® XS, and Snowtex® C can be used to prepare coating compositions of the invention. Snowtex®-OUP, which contains rod-like silica particles, can also be used. Fumed silica as well as aluminum-modified silica such as Adelite® AT-20A obtained from Asahi Denka can also be used.

It is to be understood that many types or grades of commercially available silica particles and colloidal silica can be used to prepare a coating composition of the invention. The types and grades listed above are provided only as one of many examples of silica particles that can be used in a coating composition, and the invention is not to be limited by a specific grade or type.

In other embodiments of the invention, the inorganic particles are selected from metal oxides, metal hydroxides, metal fluorides, or metal phosphates. The preferred metal oxides are aluminum oxide, titanium oxide, zirconium oxide, and iron oxide. The preferred metal fluorides are titanium fluoride and zirconium fluoride.

The coating composition of the invention also contains water. Water is used to dilute the coating composition of the invention, and provides relatively long-term stability to the composition. For example, a coating composition that contains less than about 40% by weight water is more likely to polymerize or "gel" compared to a coating composition with about 60% or greater by weight water under identical storage conditions. As a result, a coating composition of the invention preferably contains at least 60% by weight, more preferably at least 75% by weight, and most preferably at least 85% by weight, water. Although the long-term stability of a coating composition tends to be proportional to the amount of water present in the coating composition, it is to be understood that a coating composition of the invention can include a relatively high concentrated formulation with less than 60% by weight water.

The coating composition of the invention can be provided as a ready-to-use coating composition, as a concentrated coating composition that is diluted with water prior to use, or as a two component coating system. In a two-component coating system the fluoroacid is stored separately from the particles. The fluoroacid and the particles are then mixed prior to use by the end-user.

The coating compositions of the invention can also include one or more polymers. The one or more polymers preferably comprise functional groups selected from hydroxyl, carboxyl, ester, amide, or combinations thereof. The functional groups on the polymers are believed to serve various functions. First, prior to forming the coatings, the functional groups provide a polymer that has a relatively high solubility or miscibility in water. Second, the functional groups provide points along the polymer backbone through which cross-linking between the polymers can occur as the coating composition cures to form a coating on a metal substrate. Third, the functional groups on the polymer are believed to enhance binding between the metal substrate and particles in the cured coating.

An exemplary list of the one or more polymers used are selected from polyvinyl alcohol, polyester, water-soluble polyester derivatives, polyvinylpyrrolidone, polyvinylpyrrolidone-vinylcaprolactam copolymer, polyvinylpyrrolidone-vinylimidazole copolymer, and sulfonated polystyrene-maleic anhydride copolymer. The most preferred polymers used include polyvinyl alcohol, polyvinylpyrrolidone-vinylcaprolactam copolymer. Luvitec® and Elvanol® are two commercially available types of polymers that can be used to prepare a coating composition of the invention. Luvitec® is a vinylpyrrolidone-vinylcaprolactam polymer available from BASF. Elvanol® is a polyvinyl alcohol polymer available from Dupont.

The fluoroacids can function as a curing agent as well as a binding agent. The fluoroacids can function as a curing agent in the presence of one or more of the polymers recited above. It is believed that the fluoroacid reacts with the functional groups of the polymer, and thus provide a means for the polymer to cross-link. The cross-linking of the polymer in combination with the fluoroacid provides a cement-like polymer-metal oxide matrix that binds the particles to form a coating on a metal substrate. This coating can be described as a brick and mortar coating with the particles represented by the bricks and the polymer-metal oxide matrix represented by the mortar.

The amount of inorganic particles and the one or more fluoroacids used to prepare the coating compositions of the invention are provided as a weight ratio of particles:fluoroacids from 1000:1 to 1:100, preferably from 10:1 to 1:10.

A coating composition of the invention is prepared by a process comprising: providing inorganic particles, one or more fluoroacids selected from the group consisting of fluorotitanic acid, fluorozirconic acid, fluorosilicic acid, fluoroboronic acid, fluorostannic acid, fluorogermanic acid, fluorohafnic acid, fluoroaluminic acid, and salts of each thereof, a catechol compound, and water; and mixing the inorganic particles, the one or more fluoroacids, the catechol compound, and the water.

Preparation of the coating composition can also include providing one or more polymers selected from the group consisting of polyvinyl alcohol, polyester, water-soluble polyester derivatives, polyvinylpyrrolidone, polyvinylpyrrolidone-vinylcaprolactam copolymer, polyvinylpyrrolidone-vinylimidazole copolymer, and sulfonated polystyrene-maleic anhydride copolymer, and mixing the one or more polymers with the silica particles, the one or more acids, and the catechol compound. The preferred polymer being polyvinylpyrrolidone-vinylcaprolactam copolymer.

The pH of a coating composition of the invention ranges from about 3.0 to about 6.0, more preferably from about 3.5 to about 5.5. The pH of the coating composition can be adjusted using mineral acids such as hydrofluoric acid, phosphoric acid, and the like, including mixtures thereof. Alternatively, additional amounts of the fluoroacids can be used. Organic acids such as lactic acid, acetic acid, citric acid, sulfamic acid, or mixtures thereof can also be used.

The pH of the coating composition can also be adjusted by adding small amounts of an alkali material, typically in the form of a metal or ammonium hydroxide, carbonate, or bicarbonate. Exemplary inorganic and organic bases include sodium hydroxide, ammonium hydroxide, ammonia, or amines, e.g., triethylamine or other alkylamines. Also, the coating compositions can include one or more compounds selected from a leveling agent, a wetting agent, and an antifoaming agent.

The coating composition of the invention can be applied to a metal substrate to form a corrosion resistant coating. The coating comprises inorganic particles attached to the metal substrate through a metal-oxide matrix. The metal-oxide matrix comprises one or more metals selected from the group consisting of titanium, zirconium, silicon, hafnium, boron, aluminum, germanium, and tin, and a catechol compound. The metal-oxide matrix preferably comprises one or more metals selected from titanium, zirconium, and silicon. If a water soluble polymer is present in the coating composition, the metal-oxide matrix can further contain a reaction product of the one or more polymers and the one or more fluoroacids or salts of each thereof.

In some coatings of the invention, Applicants have observed a concentration gradient of catechol compound in the coating extending from the surface of the metal substrate to the exterior (top) surface of the coating. In such coatings, the concentration of catechol compound in the coating proximate to the top surface is greater than the concentration near the metal substrate. As a result, the relative concentration of the catechol compound in the coating composition necessary to provide a visible coating is less than what would be expected.

Metal substrates that can be passivated (provided with enhanced corrosion resistance) by the coating compositions of the invention include cold rolled steel, hot-rolled steel, stainless steel, steel coated with zinc metal, zinc alloys such as electrogalvanized steel, galvalume, galvanneal, and hot-dipped galvanized steel, aluminum alloys and aluminum plated steel substrates. The invention also offers the advantage that components containing more than one type of metal substrate can be passivated in a single process because of the broad range of metal substrates that can be passivated by the coating compositions of the invention.

Although not necessary, the metal substrate is usually cleaned to remove grease, dirt, or other extraneous materials by using conventional cleaning procedures and materials, e.g., mild or strong alkaline cleaners. Examples of alkaline cleaners include Parco® Cleaner ZX-1 and Parco® Cleaner 315, both of which are available from Henkel Surface Technologies. The metal substrate is then rinsed with water or an aqueous acidic solution. The metal substrate can also be treated with a commercially available metal phosphate solution, e.g., iron or zinc phosphate solutions, prior to contacting the metal substrate with a coating composition of the invention.

A coating composition of the invention is applied to the metal substrates in any number of ways known in the art. Two of the most preferred methods are spraying and immersion. The thickness of the cured coating on the metal substrate depends on a number of factors including particle size, particle concentration, and exposure time or time in contact with the coating composition.

Following treatment of a metal substrate with a coating composition, the coating composition can be dried in place on the surface of the metal substrate. Alternatively, the applied coating composition can be rinsed, preferably with water, to remove excess coating composition, and then dried. The drying can be done at any temperature. Typical convenient temperatures are from 100° F. to 300° F. The drying conditions selected depends upon the customer's preferences, space available, and the type of finish coating used. For example, a powder coating typically requires a dry surface prior to application compared to a water-based coating.

Additional coatings can then be applied. In most cases, these coatings can be a primer paint composition or a final paint coating such as a finish coat. One of the many advantages of the coatings of the invention is that the coatings are compatible with any number of protective paints such as Duracron® 200, which is a high solid, acrylic paint from PPG Industries, and powder paints such as Sunburst® Yellow, which is a polyester powder paint from Morton International. The coatings of the invention are also compatible with paints that are applied by electrodeposition.

One advantage of the coatings of the invention is that they provide comparable and, in most instances, improved corrosion resistance relative to present iron phosphate coating technology. Also, this improvement in corrosion resistance is achieved with a coating coverage that is significantly less than present iron phosphate coatings. For example, to provide an acceptable degree of corrosion resistance to a CRS panel, iron phosphate coatings are applied at a coverage level from about 50 mg/sqft to 150 mg/sqft. In contrast, a coating of the invention can provide a similar degree of corrosion resistance at a coverage level from 5 mg/sqft to 30 mg/sqft. In most cases, a coating of the invention exhibits an acceptable degree of corrosion resistance at coverage levels from 5 mg/sqft to 20 mg/sqft.

Another advantage of the coatings of the invention over iron phosphate coatings is exhibited through its relatively high flexibility and durability. In impact tests and bending tests the coatings of the invention typically maintain their corrosion resistance while the iron phosphate coatings do not. Moreover, these tests were performed with coatings of the invention at coverage levels of less than 20 mg/sqft, while the iron phosphate coatings had coverage levels of about 65 mg/sqft.

The invention and its benefits will be better understood with reference to the following examples. These examples are intended to illustrate specific embodiments within the overall scope of the invention as claimed, and are not to be understood as limiting the invention in any way.

1. Preparation of the Metal Substrates.

Panels of cold-rolled steel and electrogalvanized steel used to test the corrosion resistance of the cured coatings are pretreated as follows. The panels are treated with Parco Cleaner 1523, which is an alkaline cleaner available from Henkel Surface Technologies. The panels are sprayed with the cleaner (about 2% in water) at 120° F. for 2 minutes. The cleaned panels are rinsed with a warm tap water spray for 30 seconds. A coating composition of the invention is sprayed on the rinsed panels for 30 seconds at ambient temperature. Alternatively, the panels are immersed in the coating compositions. The coated panels are then optionally rinsed with a cold water spray rinse for 30 seconds. Typically, if a relatively high particle content coating composition of the invention is used, a water rinse will follow to remove residual (unbound) particles from the panels. The water rinse is not usually necessary for relatively low particle content coating compositions. The panels are then dried at 300° F. for 5 minutes. Coating weight of this invention was obtained by measuring the metal content, e.g., silicon, titanium, and zirconium, using x-ray fluorescence of the coated panels.

2. Application of Finish Coat on Coated Substrates.

The coated and dried panels are painted with Duracron 200, a polyacrylic enamel coating commercially available from PPG Industries, Inc., or Sunburst Yellow, an epoxy-polyester hybrid powder paint commercially available from Morton International. The painted panels are allowed to cure according to recommendations by the manufacturer.

3. Corrosion Tests.

To test the corrosion resistance of the panels, the panels are scribed and a salt solution (5% NaCl) is sprayed on the scribed panels for either 500 hr or 750 hr (ASTM B-117 method). The corrosion resistance of the coated panels is evaluated by measuring the creepage from the scribe. The data reported in Table 3 is the distance in mm of the widened scribe following corrosion by the spray solution on CRS panels. As a result, the smaller the number, the more effective the corrosion resistance of the coating.

COMPARATIVE EXAMPLES 1, 2 AND 3

Comparative Examples 1, 2 and 3 are coating compositions prepared according to the weight percents of each listed component provided in Table 1. Comparative Example 1 is prepared with methylene blue, which is a cationic non-catechol colorant compound. Comparative Example 2 is prepared with congo red, which is also a non-catechol colorant compound. Comparative Example 3 is prepared with celestine blue, which is a cationic catechol compound. As shown in Table 1 the colorant compounds used in Comparative Examples 1, 2 and 3 do not provide a red or blue tone on the treated panel.

EXAMPLES 1 AND 2

Examples 1 and 2 are coating compositions prepared according to the weight percents of each listed component provided in Table 1. Example 1 is prepared with pyrocatechol sulfonephthalein (pyrocatechol violet) which is a negatively charged catechol compound at the acidic pH range of the coating composition. Example 2 is prepared with 4,3-dihydroxy-9,10-dioxo-2-anthracenesulfonic acid sodium salt (alizarin red), which is also a negatively charged catechol compound. As shown in Table 1, Examples 1 and 2 do provide a blue and red tone, respectively, on the treated panel.

COMPARATIVE EXAMPLES 4 AND 5

Comparative Examples 4 and 5 are coating compositions prepared according to the weight percents of each listed component provided in Table 2. The pH of comparative example 4 is 3.3, and the pH of comparative example 5 is 6.0. No blue tone is visible on the treated substrates.

COMPARATIVE EXAMPLE 6

Comparative Example 6 is a coating composition prepared according to the weight percents of each listed component provided in Table 2. Comparative example 6 does not contain silica particles according to the invention. No blue tone is visible on the treated substrate.

TABLE 1

| Component | Comp. Ex. 1 | Comp. Ex. 2 | Comp. Ex. 3 | Ex. 1 | Ex. 2 |
|---|---|---|---|---|---|
| Ludox TMA, 34% solids | 0.5 | 0.5 | 0.5 | 0.5 | 0.5 |
| $H_2TiF_6$ (60%), % | 0.01 | 0.01 | 0.01 | 0.01 | 0.01 |
| $H_2ZrF_6$ (20%), % | 0.005 | 0.005 | 0.005 | 0.005 | 0.005 |
| Methylene blue, cationic non-catechol colorant, % | 0.005 | 0 | 0 | 0 | 0 |
| Congo red, non-catechol, % | 0 | 0.005 | 0 | 0 | 0 |
| celestine blue, cationic catechol, % | 0 | 0 | 0.005 | 0 | 0 |
| pyrocatechol violet, catechol sulfonate, % | 0 | 0 | 0 | 0.005 | 0 |
| alizarin red, catechol sulfonate, % | 0 | 0 | 0 | 0 | 0.005 |
| water | 99.485 | 99.485 | 99.485 | 99.485 | 99.485 |
| pH | 4.2 | 4.2 | 4.3 | 4.3 | 4.2 |
| panel | CRS | CRS | CRS | CRS | CRS |
| red tone on panel | no | no | no | no | yes |
| blue tone on panel | no | no | no | yes | no |

TABLE 2

| Component | Comp. Ex. 4 | Comp. Ex. 5 | Comp. Ex. 6 | Ex. 3 | Ex. 4 | Ex. 5 | Ex. 6 |
|---|---|---|---|---|---|---|---|
| Ludox TMA, 34% solids | 0.2 | 0.2 | 0 | 0.2 | 0.2 | 0.2 | 0.2 |
| $H_2ZrF_6$ (20%), % | 0.1 | 0.1 | 0.1 | 0.1 | 0.1 | 0.1 | 0.1 |
| pyrocatechol violet, % | 0.001 | 0.001 | 0.001 | 0.001 | 0.001 | 0.001 | 0.001 |
| water % | 99.699 | 99.699 | 99.699 | 99.699 | 99.699 | 99.699 | 99.699 |
| pH | 3.3 | 6.0 | 4.3 | 3.6 | 4.1 | 4.9 | 5.5 |
| panel | CRS | EG | CRS | EG | CRS | EG | CRS |
| blue tone on panel | no | no | no | yes | yes | yes | yes |

EXAMPLES 3, 4, 5 AND 6

Examples 3, 4, 5 and 6 are coating compositions prepared according to the weight percents of each listed component provided in Table 2. The pH of example 3 is 3.6. The pH of example 4 is 4.1. The pH of example 5 is 4.9. The pH of example 6 is 5.5. A blue tone is visible on the treated substrates.

Preparation of Comparative Examples 4–6 and Examples 3–6.

Fluorozirconic acid (4 g, 20% in water) is added to 3987.96 g of water with stirring. As this acid solution is stirred 8 g of Ludox TMA particle dispersion (34% solids) is added. (No silica is added to Comparative Example 6) The pH of this mixture is adjusted to the selected pH by adding ammonium carbonate and small amounts of fluorozirconic acid. The mixture is stirred for two hours. Pyrocatechol violet, 0.04 g, is added and the solution stirred for 1 hour. Cleaned and rinsed substrates (panels) are immersed in the coating compositions for two minutes at ambient temperatures. The panels are then rinsed with distilled water.

COMPARATIVE EXAMPLES 7 AND 8

Comparative Examples 7 and 8 are coating compositions prepared according to the weight percents of each listed component provided in Table 3. Comparative examples 7 and 8 contain no catechol compound according to the invention. There is little or no difference in the anti-corrosion properties between Comparative Examples 7 and 8 and Examples 7 to 10 (with catechol compounds) for both CRS and EG substrates.

EXAMPLES 7, 8, 9 AND 10

Examples 7, 8, 9 and 10 are coating compositions prepared according to the weight percents of each listed component provided in Table 3.

TABLE 3

| Component | Comp. Ex. 7 | Comp. Ex. 8 | Ex. 7 | Ex. 8 | Ex. 9 | Ex. 10 |
|---|---|---|---|---|---|---|
| Ludox TMA, 34% | 0.5 | 0.5 | 0.5 | 0.5 | 0.5 | 0.5 |
| $H_2TiF_6$ (60%), % | 0.01 | 0.01 | 0.01 | 0.01 | 0.01 | 0.01 |
| $H_2ZrF_6$ (20%), % | 0.005 | 0.005 | 0.005 | 0.005 | 0.005 | 0.005 |
| alizarin red | 0 | 0 | 0.0025 | 0.0025 | 0.005 | 0.005 |
| water | 99.485 | 99.485 | 99.4825 | 99.4825 | 99.48 | 99.48 |
| pH | 4.2 | 4.2 | 4.3 | 4.3 | 4.2 | 4.2 |
| panel | CRS | EG | CRS | EG | CRS | EG |
| red tone on panel | no | no | yes | yes | yes | yes |
| total scribe, mm, 500 hr NSS, Duracron 200 | 12.4 | — | 13 | — | 10.8 | — |
| total scribe, mm, 750 hr NSS, Sunburst yellow | 3.4 | — | 3.6 | — | 3.5 | — |
| total scribe, mm, 20 cycles GM9540P, Duracron 200 | — | 2.5 | — | 2.6 | — | 3.1 |
| total scribe, mm, 40 cycles GM9540P, Sunburst yellow | — | 1.9 | — | 2.1 | — | 1.8 |

We claim:

1. A coating composition comprising an aqueous mixture comprising a catechol compound, one or more fluoroacids, and alumina-modified silica particles with a $SiO_2:Al_2O_3$ weight ratio from 80:1 to 240:1.

2. The coating composition of claim 1 wherein the one or more fluoroacids are selected from the group consisting of fluorotitanic acid, fluorozirconic acid, fluorosilicic acid, fluoroboronic acid, fluorostannic acid, fluorogermanic acid, fluorohafnic acid, fluoroaluminic acid and salts of each thereof.

3. The coating composition of claim 1 wherein the mixture further comprises a product of the particles and the one or more fluoroacids.

4. The coating composition of claim 1 wherein the particles comprise about 0.01% to about 5% by weight of the composition, and the coating composition has a pH from 4.1 to 5.5.

5. The coating composition of claim 1 wherein the catechol compound is an alizarin compound.

6. The coating composition of claim 1 wherein the catechol compound is 4,3-dihydroxy-9,10-dioxo-2-anthracenesulfonic acid or a salt thereof.

7. The coating composition of claim 1 wherein the catechol compound is pyrocatechol or a conjugated pyrocatechol.

8. The coating composition of claim 1 wherein the catechol compound is pyrocatechol sulfonephthalein.

9. The coating composition of claim 8 wherein the catechol compound is provided as a weight ratio of fluoroacids:catechol from 300:1 to 1:30.

10. The coating composition of claim 1 wherein the one or more fluoroacids are present at a concentration from about 3 ppm to about 400 ppm.

11. The coating composition of claim 1 wherein the one or more fluoroacids are present at a concentration from about 3 ppm to about 3000 ppm, and the coating composition has a pH from 4.1 to 5.5.

12. The coating composition of claim 1 further comprising one or more polymers selected from the group consisting of polyvinyl alcohol, polyester, water-soluble polyester derivatives, polyvinylpyrrolidone, polyvinylpyrrolidone-vinylcaprolactam copolymer, polyvinylpyrrolidone-vinylimidazole copolymer, and sulfonated polystyrene-maleic anhydride copolymer.

13. The coating composition of claim 1 wherein the coating composition has a pH from 4.1 to 5.5.

14. The coating composition of claim 1 wherein the one or more fluroacids are selected from the group consisting of fluorotitanic acid, fluorozirconic acid, fluorosilicic acid, and salts of each thereof.

15. A coating composition prepared by a process comprising:
providing alumina-modified silica particles with a $SiO_2:Al_2O_3$ weight ratio from 80:1 to 240:1, one or more fluoroacids, a catechol compound, and water; and
mixing the alumina-modified silica particles, the one or more fluoroacids, the catechol compound, and the water.

16. The coating composition of claim 15 further comprising providing one or more polymers selected from the group consisting of polyvinyl alcohol, polyester, water-soluble polyester derivatives, polyvinylpyrrolidone, polyvinylpyrrolidone-vinylcaprolactam copolymer, polyvinylpyrrolidone-vinylimidazole copolymer, and sulfonated polystyrene-maleic anhydride copolymer, and mixing the one or more polymers with the silica particles, the one or more acids, and the catechol compound.

17. The coating composition of claim 15 further comprising adding additional amounts of the one or more acids or an alkali material to adjust the pH of the coating composition to a pH value from about 3 to about 6.

18. The coating composition of claim 15 wherein the catechol compound is negatively charged or neutral.

19. The coating composition of claim 15 wherein the catechol is selected from the group consisting of an alizarin compound, a pyrocatechol, a conjugated pyrocatechol, and salts of each thereof.

20. The coating composition of claim 15 wherein the one or more fluoroacids are selected from the group consisting of fluorotitanic acid, fluorozirconic acid, fluorosilicic acid, fluoroboronic acid, fluorostannic acid, fluorogermanic acid, fluorohafnic acid, fluoroaluminic avid, and salts of each thereof.

21. The coating composition of claim 17 wherein the pH is adjusted to a value of 4.1 to 5.5.

22. The coating composition of claim 15 wherein the one or more fluoroacids are present at a concentration from about 3 ppm to about 400 ppm.

23. A coating composition comprising an aqueous mixture comprising:
inorganic particles;
one or more fluoroacids; and
pyrocatechol sulfonephthalein, wherein the coating composition has a pH from 4.1 to 5.5.

24. The coating composition of claim 23 wherein the pyrocatechol sulfonephthalein is provided as a weight ratio of fluoroacids: pyrocatechol sulfonephthalein from 300:1 to 1:30.

25. The coating composition of claim 23 wherein the inorganic particles are selected from the group consisting of metal oxides, and metal fluorides, wherein the metal is titanium, zirconium, aluminum, or iron.

26. The coating composition of claim 23 wherein the inorganic particles are silica particles.

* * * * *